(12) United States Patent
Giri

(10) Patent No.: US 8,037,120 B2
(45) Date of Patent: Oct. 11, 2011

(54) SYSTEM AND METHOD FOR AN EFFICIENT COMPARISON OPERATION OF MULTI-BIT VECTORS IN A DIGITAL LOGIC CIRCUIT

(75) Inventor: Abhijit Giri, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 1257 days.

(21) Appl. No.: 11/566,692

(22) Filed: Dec. 5, 2006

(65) Prior Publication Data
US 2008/0133628 A1  Jun. 5, 2008

(51) Int. Cl.
*G06F 7/50* (2006.01)
*G06F 7/00* (2006.01)
*G06F 15/00* (2006.01)

(52) U.S. Cl. .................................. 708/671; 708/210
(58) Field of Classification Search ............ 708/210
See application file for complete search history.

(56) References Cited

U.S. PATENT DOCUMENTS

| | | | | |
|---|---|---|---|---|
| 4,498,177 A | * | 2/1985 | Larson | 714/806 |
| 5,375,080 A | * | 12/1994 | Davies | 708/525 |
| 5,487,133 A | | 1/1996 | Park et al. | |
| 5,835,389 A | * | 11/1998 | Wong | 708/201 |
| 2001/0055311 A1 | | 12/2001 | Trachewsky et al. | |

OTHER PUBLICATIONS

International Search Report for PCT/US07/24852, mailed Dec. 23, 2009, 2 pages.
Written Opinion for PCT/US07/24852, mailed Dec. 23, 2009, 6 pages.

* cited by examiner

*Primary Examiner* — Lewis Bullock, Jr.
*Assistant Examiner* — Kevin G Hughes
(74) *Attorney, Agent, or Firm* — Bingham McCutchen LLP

(57) ABSTRACT

An improved technique that considerably reduces required logic and computational time for determining whether the difference between two multi-bit vectors is equal to a given number or lies between given two numbers in a digital logic circuit. In one example embodiment, this is accomplished by receiving a first N-bit vector A [N−1:0] and a second N-bit vector B[N−1:0] in the digital logic circuit, where N is a non-zero positive number. A third N-bit vector is then obtained by performing a bit-wise AND (A [N−1:0] & ~B[N−1:0]) operation using A[N−1:0] and ~B[N−1:0]. Further, a fourth N-bit vector is obtained by performing a bit-wise XOR (A[N−1:0]^~B[N−1:0]) operation using A[N−1:0] and ~B[N−1:0]. The difference between the first N-bit vector A[N−1:0] and the second N-bit vector B[N−1:0] is then declared as equal to a given number or to be within a given range of two numbers (+m and +n, m<n) based on bit patterns in the third N-bit vector and the fourth N-bit vector.

9 Claims, 5 Drawing Sheets

SYSTEM AND METHOD FOR AN EFFICIENT COMPARISON OPERATION OF MULTI-BIT VECTORS IN A DIGITAL LOGIC CIRCUIT

TECHNICAL FIELD OF THE INVENTION

The present invention relates to digital logic circuit, and more particularly to a comparison logic unit within a digital integrated circuit.

BACKGROUND OF THE INVENTION

Comparison of two multi-bit vectors is a common operation performed in digital logic circuits. It is also common to perform a comparison operation for equality in the digital logic circuits. In addition, sometimes it is required to determine if two multi-bit vectors differ in value by a certain amount. For example, it is often required to perform a comparison operation to find whether the difference between two multi-bit vectors is equal to +1, +2, . . . or +n. Frequently, it is also required to determine if the difference between the two multi-bit vectors A[N−1:0] and B[N−1:0] is within a range of +m to +n, m<n, when both m and n are known, i.e., to evaluate inequality +m≦A[N−1:0]−B[N−1:0]≦+n.

Traditionally, the comparison operation performed on two multi-bit vectors to check for equality, such as A[N−1:0]==B[N−1:0]+n would require an N-bit adder/subtractor followed by an N-bit comparator in a digital logic circuit. Further, conventional techniques to perform an operation to determine whether the difference between two vectors is within a certain range require at least one adder/subtractor and multiple comparators. Generally, each adder/subtractor within a digital logic circuit requires considerable number of logic gates, which requires significant silicon area. In addition, it results in significant delay.

SUMMARY OF THE INVENTION

According to an aspect of the subject matter, there is provided a method for comparison of two multi-bit vectors within a digital logic circuit, comprising the steps of receiving a first N-bit vector A[N−1:0] and a second N-bit vector B[N−1:0] in the digital logic circuit, wherein N is a non-zero positive number, obtaining a third N-bit vector by performing a bit-wise AND (A[N−1:0] & ~B[N−1:0]) operation using the A[N−1:0] and ~B[N−1:0], wherein ~B[N−1:0] is obtained by inverting each bit in the second N-bit vector B[N−1:0], obtaining a fourth N-bit vector by performing a bit-wise XOR (A[N−1:0]^~B[N−1:0]) operation using A[N−1:0] and ~B[N−1:0], and declaring whether a difference between the A[N−1:0] and B[N−1:0] to be equal to a given number or to be within a given range of two numbers, +m and +n, based on bit patterns in the third N-bit vector and the fourth N-bit vector, wherein m<n.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "multi-bit vector" and "N-bit vector" are used interchangeably throughout the document. Further, the terms first N-bit vector, first N-bit vector A[N−1:0], and A[N−1:0] are used interchangeably throughout the document. Furthermore, the terms second N-bit vector, second N-bit vector B[N−1:0], and B[N−1:0] are used interchangeably throughout the document. Also, the term "0 to 1" and "0−>1" are used interchangeably throughout the document. In addition, the notations "0" and "1" are used to signify values of 0 and 1 as low and high logic levels, respectively, in the context of digital logic circuits.

Also, the equality logic A[N−1:0]==B[N−1:0]+n is represented and used in equivalent forms A[N−1:0]−B[N−1:0]==n, A[N−1:0]+~B[N−1:0]+1==n, and A[N−1:0]+~B[N−1:0]==n−1 throughout the document. For the equality logic to hold true for comparison operations when n=1, the sum of A[N−1:0]+~B[N−1:0] should produce a 0. Similarly, for the equality to be true for n=2, A[N−1:0]+~B[N−1:0] must produce 1 and so on.

Figure 1:
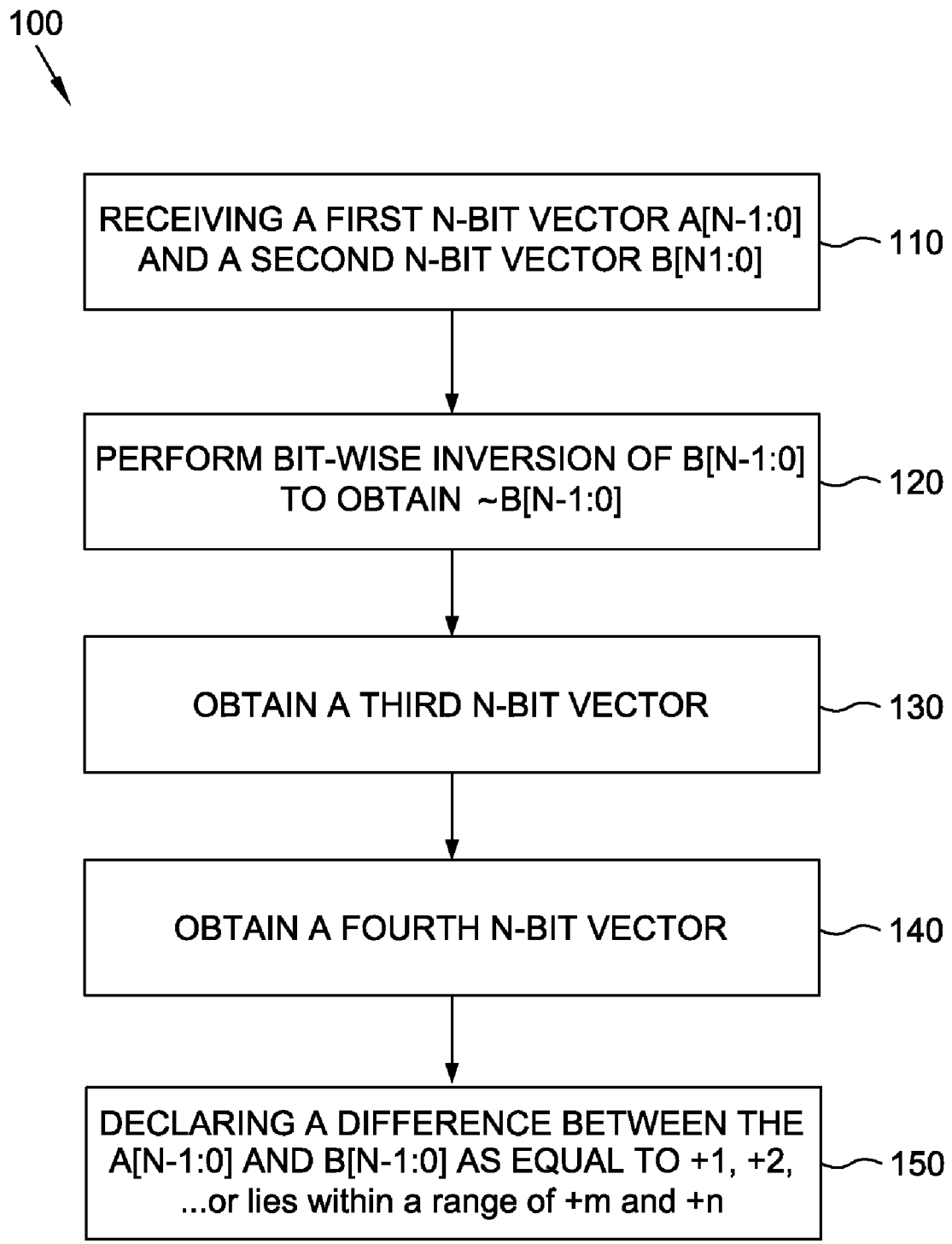
FIG. 1 illustrates a flowchart according to an embodiment of the present subject matter for implementing the comparison operation within a digital logic circuit.

FIG. 1 illustrates an example method 100 for performing a comparison operation on two multi-bit vectors when the difference between two operands is equal to +n for a given n or is within a range of two given numbers, +m and +n. At step 110, the method 100 begins by receiving a first N-bit vector A[N−1:0] and a second N-bit vector B[N−1:0]. The N-bit vector can be any multi-bit vector. In some embodiments, the N-bit vector is an 8-bit vector, a 16-bit vector, a 24-bit vector, a 32-bit vector or a 64-bit vector.

At step 120, a bit-wise inversion of B[N−1:0] is performed to obtain a ~B[N−1:0], i.e., ~B[N−1:0] is obtained by inverting every bit of B[N−1:0]. At step 130, a third N-bit vector is obtained by performing a bit-wise AND (A[N−1:0] & ~B[N−1:0]) operation using the received A[N−1:0] and the obtained ~B[N−1:0]. At step 140, a fourth N-bit vector is obtained by performing a bit-wise XOR (A[N−1:0]^~B[N−1:0]) operation using the received A[N−1:0] and the obtained ~B[N−1:0].

At step 150, the difference between the received A[N−1:0] and the B[N−1:0] is declared to be equal to +n, for a given n or lies within a range of +m and +n, when m and n are given and m<n, based on bit patterns in the third N-bit vector and the fourth N-bit vector. For example, step 150 may determine if the difference between the received A[N−1:0] and the B[N−1:0] is either 0 or 1 based on the bit patterns in the third N-bit vector and the fourth N-bit vector. The following examples describe specific cases of comparison operations:

Case (1): Evaluation of Equality A==B+n, when n=1 (A_EQ_B_PLUS_1)

In some embodiments, for comparison operations for n=1. i.e., the difference between the received A[N−1:0] and the B[N−1:0] is equal to +1 (i.e., A[N−1:0]==B[N−1:0]+1), at step 150, the above method 100 determines whether A[N−1:0] and ~B[N−1:0] result in 0 when they are added.

The following example table, using 8-bit vectors, illustrates the method 100.

|  |  |  |  |  |  | g |  |  |  |
|---|---|---|---|---|---|---|---|---|---|
| First 8-bit vector | A | 0 | 1 | 0 | 1 | 1 | 0 | 1 | 0 | 0 |
|  | ~B | 1 | 0 | 1 | 0 | 0 | 1 | 1 | 0 | 0 |
| Third 8-bit vector | AND (A & ~B) | 0 | 0 | 0 | 0 | 0 | 0 | 1 | 0 | 0 |
| Fourth 8-bit vector | XOR (A ^ ~B) | 1 | 1 | 1 | 1 | 1 | 1 | 0 | 0 | 0 |
|  | XOR >> 1 | 1 | 1 | 1 | 1 | 1 | 1 | 1 | 0 | 0 |
| Fifth 8-bit vector | XOR ^ (XOR >> 1) | 0 | 0 | 0 | 0 | 0 | 0 | 1 | 0 | 0 |
| Sixth 8-bit vector | Third ^ Fifth | 0 | 0 | 0 | 0 | 0 | 0 | 0 | 0 | 0 |

|  |  |  |  |  |  | g |  |  |  |
|---|---|---|---|---|---|---|---|---|---|
| First 8-bit vector | A[N − 1:0] | 0 | 1 | 0 | 1 | 1 | 0 | 1 | 0 | 0 |
|  | ~B[N − 1:0] | 1 | 0 | 1 | 0 | 0 | 1 | 1 | 0 | 0 |
| Third 8-bit vector | AND (A & ~B) | 0 | 0 | 0 | 0 | 0 | 0 | 1 | 0 | 0 |
| Fourth 8-bit vector | XOR (A ^ ~B) | 1 | 1 | 1 | 1 | 1 | 1 | 0 | 0 | 0 |

It can be seen in the above example that to the right of an arbitrary bit position g, all bits of A[N−1:0] and ~B[N−1:0] are equal to 0, which give rise to a 0 as sum bits and not generating a carry. In the above example table both the bits of A[N−1:0] and ~B[N−1:0] at the arbitrary bit position g are equal to 1 thereby producing a 0 as sum bit and generating a carry. In all the bit positions to the left of the arbitrary bit position g in either A[N−1:0] or ~B[N−1:0] and not both have 1 so that they can propagate a carry and produce a sum of 0.

Therefore, it can be seen from the above example table that the problem of detecting A[N−1:0]−B[N−1:0]==1 or equivalently A[N−1:0]+~B[N−1:0]==0 is equivalent to identifying the existence of above bit pattern in A[N−1:0] and ~B[N−1:0], which is aided by the third N-bit vector and the fourth N-bit vector, which are characterized as below:
  1. Only one 0 to 1 bit transition is found when fourth N-bit vector bits are scanned from right to left
  2. The third N-bit vector bits have only one 1 at the 0 to 1 bit transition bit position, i.e., the arbitrary bit position g In these embodiments, at step 150, the method 100 further determines whether a bit in the corresponding bit position, where the 0 to 1 bit transition occurs in the fourth N-bit vector, is equal to 1 in the third N-bit vector and remaining bits are equal to 0. Further, at step 150 the method 100 determines if there is only one 0 to 1 bit transition present in the fourth N-bit vector. The method 100 then declares the difference between the first N-bit vector A[N−1:0] and the second N-bit vector B[N−1:0] as equal to +1 or the method 100 declares as A[N−1:0]−B[N−1:0]==+1.

The detection of 0->1 bit transition in the fourth N-bit vector bits is accomplished by performing a bitwise XOR operation between the fourth N-bit vector bits and the same bits shifted right by one bit position to the right, thereby generating a fifth N-Bit vector, assuming LSB is the rightmost bit. While shifting the bits to the right, the left-most bit or the MSB is copied to an empty position created by the right-shift. A sixth N-bit vector is generated by performing a bit-wise XOR operation between the third N-bit vector and the fifth N-bit vector. In these embodiments, the sixth N-bit vector has only 0's, which are detected by performing a NOR operation on all of its bits. If this NOR operation yields 1, then the bits in the fifth N-bit vector are exactly matched with the third N-bit vector bits.

It can be seen in the above table that, to have MSB of the fourth N-bit vector bits as equal to 1 is equivalent to requiring A[N−1:0] and B[N−1:0] to be positive numbers and having 0 as their MSBs. If vectors A[N−1:0] and B[N−1:0] are to be treated as unsigned numbers in their interpretation, a 0 bit can be added to both the vectors A[N−1:0] and B[N−1:0] in the position left to the MSB, thereby effectively increasing the width of the two multi-bit vectors by 1.

For the above method to yield a correct result, the fourth N-bit vector needs to have one and only one 0 to 1 bit transition. When the fourth N-bit vector bits are all equal to 1 and the third N-bit vector bits are equal to 0, the above described method of checking for 0->1 transition in the fourth N-bit vector may not yield the right result. This boundary case can be excluded by requiring the third N-bit vector bits to be not all equal to 0's.

The entire operation can be represented using the following logic equations:

$A\_EQ\_B\_PLUS\_1 =$ $(\sim |(XOR[N-1:0] \char`\^ (XOR[N-1:0] \gg 1)) \char`\^ AND[N-1:0])$
$\quad \& |AND[N-1:0]$ or equivalently $A\_EQ\_B\_PLUS\_1 =$ $(\&(XOR[N-1:0] \sim \char`\^ (XOR[N-1:0] \gg 1)) \char`\^ AND[N-1:0])$
$\quad \& |AND[N-1:0]$ wherein AND[N−1:0] is third N-bit vector and XOR[N−1:0] is fourth N-bit vector.

The bit-shift operation of the fourth N-bit vector i.e., XOR>>1 is an arithmetic right shift by one bit position that preserves the MSB. &, ^, | and ~ are bitwise AND, XOR, OR and INVERT operations respectively. The & and | operators included at the beginning of right hand side of the equation signify AND and OR reduction operations, respectively.

Case (2): Evaluation of Equality A==B+n, when n=2 (A_EQ_B_PLUS_2)

In some embodiments, for comparison operations involving n=2, i.e., the difference between the received A[N−1:0] and the B[N−1:0] is equal to +2 such that A[N−1:0]==B[N−1:0]+2 or equivalently A[N−1:0]+~B[N−1:0]==+1, is illustrated in the following table using our 8-bit vector running example. It can be seen that the above-described addition process of A[N−1:0]+~B[N−1:0], produces all 0's except at LSB, where it results in being equal to 1. Therefore, the bit patterns of A[N−1:0] and ~B[N−1:0] can only be as shown in the following table:

|     |   |   |   |   | g |   |   |   |   |
|-----|---|---|---|---|---|---|---|---|---|
| A   | 0 | 1 | 0 | 1 | 1 | 0 | 1 | 0 | 0 |
| ~B  | 1 | 0 | 1 | 0 | 0 | 1 | 1 | 0 | 1 |
| or  |   |   |   |   |   |   |   |   |   |
| A   | 0 | 1 | 0 | 1 | 1 | 0 | 1 | 0 | 1 |
| ~B  | 1 | 0 | 1 | 0 | 0 | 1 | 1 | 0 | 0 |

Thus, for comparison operations involving n=2, i.e., the difference between the received A[N−1:0] and the B[N−1:0] is equal to +2 such that A[N−1:0]==B[N−1:0]+2, at step 150, the method 100 determines whether the LSBs of A[N−1:0] and the ~B[N−1:0] are different (i.e., the method 100 determines whether the LSBs are either 0 and 1 or 1 and 0, respectively). If the LSBs of A[N−1:0] and the ~B[N−1:0] are different, then the method 100 at step 150 further determines whether all other bits of A[N−1:0] and ~B[N−1:0], i.e., A[N−1:1] and ~B[N−1:1] result in 0 when the first N-bit vector and the third N-bit vectors are added. At step 150, this can be determined by applying the same operations as described-above in the section "Evaluation of Equality A==B+n, when n=1 (A_EQ_B_PLUS_1)" but on A[N−1:1] and ~B[N−1:1] bits only, which essentially determines A[N−1:1]+~B[N−1:1]==0. If LSBs of A[N−1:0] and ~B[N−1:0] i.e., A[N−0] and ~B[N−0] are different and also remaining bits of A[N−1:0] and ~B[N−1:0], i.e., A[N−1:1] and ~B[N−1:1] result in 0 when added, then the method 100, at step 150 declares the difference between the received first N-bit vector A[N−1:0] and the second N-bit vector B[N−1:0] as equal to +2, i.e., n=+2.

Using the similar logic notations as described before, the above operations, involving equality for cases involving n=2, can be represented using the following equation:

$A\_EQ\_B\_PLUS\_2=$ $(\sim|(XOR[N-1:1]\char`\^(XOR[N-1:1]>>1))\char`\^AND[N-1:1])$
$\&|AND[N-1:1])$ $\& XOR[0]$.

Case (3): Evaluation of Equality A==B+n, when n=3 (A_EQ_B_PLUS_3)

In some embodiments, for comparison operations involving n=3 (the difference between the received A[N−1:0] and the B[N−1:0] is equal to +3 such that A[N−1:0]==B[N−1:0]+3, or equivalently A[N−1:0]+~B[N−1:0]==2), the addition process A[N−1:0]+~B[N−1:0] produces all 0's in all positions except at two LSBs, where it produces a binary string 10. The following combinations in the two LSBs of A[N−1:0] and the associated two LSBs of ~B[N−1:0] produce 10

| 1. | A  | 00 |
|----|----|----|
|    | ~B | 10 |
| 2. | A  | 10 |
|    | ~B | 00 |
| 3. | A  | 01 |
|    | ~B | 01 |
| 4. | A  | 11 |
|    | ~B | 11 |

If the two LSB's of A[N−1:0] and B[N−1:0] are same as one of the above listed first three cases, then all the remaining bits of A[N−1:0] and B[N−1:0] produces 0's when the first N-bit vector and the second N-bit vector are added. In these embodiments, the method described with reference to section "Evaluation of Equality A==B+n, when n=1" can be applied for those bits viz., [N−1:2]. If the two LSB's of A[N−1:0] and B[N−1:0] are same as in the above listed last case, then it results in a carry to $3^{rd}$ LSB position. In such a case, to yield all 0's in the all but two LSB positions, all the remaining bits, i.e., A[N−1:2] and ~B[N−1:2] must produce all 1's when added.

Therefore, for n=3, the above method 100 at step 150, determines whether two LSBs of A[N−1:0] and associated two LSBs of ~B[N−1:0] are equal to 10 and 00, 00 and 10, or 01 and 01. If the two LSBs of A[N−1:0] and the associated two LSBs of ~B[N−1:0] are equal to 10 and 00, 00 and 10, or 01 and 01, the method 100 at step 150 then determines whether A[N−1:2]+~B[N−1:2]==0, by applying the same operations outlined with reference to section "Evaluation of Equality A==B+n, when n=1" on bits [N−1:2] of A[N−1:0] and ~B[N−1:0]. If these two checks are successful, then the method 100 declares the difference between the first N-bit vector A[N−1:0] and the second N-bit vector B[N−1:0] as equal to +3. If method 100 at step 150 determines that the two LSB's of both A[N−1:0] and ~B[N−1:0] are 11, then the method 100 further determines if in all the remaining bit positions of the fourth vector i.e., XOR[N−1:2] are all 1's. The method 100 then declares the difference between the first N-bit vector A[N−1:0] and the second N-bit vector B[N−1:0] as equal to +3.

The following illustrates the above-described operational scenarios in an equation form:

If no_carry=$(A[1:0]==00\ \&\ \sim B[1:0]==10)|$ $(A[1:0]==0\ \&\ \sim B[1:0]==00)|$ $(A[1:0]==01\ \&\ \sim B[1:0]==01)$ with_carry=$(A[1:0]==11\ \&\ \sim B[1:0]==11)$ then $A\_EQ\_B\_PLUS\_3=$ no_carry &

$(\sim|(XOR[N-1:2]\char`\^(XOR[N-1:2]>>1))\char`\^AND[N-1:2])$
$\&|AND[N-1:2])|$ with_carry &

$(\&|XOR[N-1:2])$

Case (4): Evaluation of Equality A==B+n, when n>3

It can be seen that the above described method for n=+3 can be generally extended to any given number, i.e., n>3. For any given n, A[N−1:0]+~B[N−1:0] needs to be equal n−1. Further, the appropriate number of least significant bits of A[N−

1:0] and ~B[N−1:0] need to be checked to see if they add to n−1. If there is a carry generated from this sum of the least significant bits, the rest of the bits in the fourth N-bit vector must be all equal to 1's. If there is no carry, the method for the case n=1 outlined in the section "Evaluation of Equality A==B+n, when n=1" is applied to the remaining bits of A[N−1:0] and ~B[N−1:0] to check if they yield 0 when added.

Case (5): Evaluation of Inequality m≦A−B≦n

In some embodiments, it can be envisioned that with a slight modification, the above technique can also be used to determine whether the difference between two received multi-bit vectors are within a range +m to +n, m<n. This comparison also involves detection of 0 in high order bits of the sum of A[N−1:0] and ~B[N−1:0], for which the same method as outlined in section "Evaluation of Equality A==B+n, when n+1" can be applied on the appropriate bits. For example, it can be determined whether the difference between A[N−1:0] and ~B[N−1:0] lies within 0 and +1 (i.e., A[N−1:0] ==B[N−1:0] or A[N−1:0]==B[N−1:0]+1) or within 0 and +2 (i.e., A[N−1:0]==B[N−1:0N−1:0] or A[N−1:0]==B[N−1:0]+1 or A[N−1:0]==B[N−1:0]+2). For example, to determine whether the difference between two received multi-bit vectors are within 0 and +1 (i.e., A[N−1:0]==B[N−1:0]+1 or A[N−1:0]==B[N−1:0]+1), the above-described method 100 with reference to determining the difference between two received vectors to be +1 outlined in section "Evaluation of Equality A==B+n, when n=1" can be used after eliminating of the step of checking whether there is at least one bit in the third N-bit vector is equal to 1. Using the similar logic notations as before, this inequality 0≦A−B≦1 can be represented in the following equation form:

$A\_EQ\_B\_PLUS\_0\_OR\_1=$ $(\sim|(XOR[N-1:0]\hat{\ }(XOR[N-1:0]>>1))\hat{\ }AND[N-1:0])$ Similarly, for determining whether the difference between two received multi-bit vectors are either equal to +1 or +2 (i.e., A[N−1:0]==B[N−1:0]+1 or A[N−1:0]==B[N−1:0]+2), the above-described method 100 with reference to n=+2 as outlined in the section "Evaluation of Equality A==B+n, when n=2" can be used after substituting the step of checking whether the LSB's of A[N−1:0] and ~B[N−1:0] are 0 and 1 or 1 and 0 with checking whether the LSB's of A[N−1:0] and ~B[N−1:0] are not both equal to 1's. Using similar logic notations as before this equality can be represented using the following equation:

$A\_EQ\_B\_PLUS\_1\_OR\_2=$ $(\sim|(XOR[N-1:1]\hat{\ }(XOR[N-1:1]>>1))\hat{\ }AND[N-1:1])\ \&\ |AND[N-1:1])$ $\&\ \sim AND[0]$.

It should be apparent to those ordinarily skilled in the art, how the above illustrations can be extended to perform the comparison operation involving different given ranges of numbers.

Although the flowchart 100 includes steps 110-150 that are arranged serially in the exemplary embodiments, other embodiments of the subject matter may execute two or more steps in parallel. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 2:
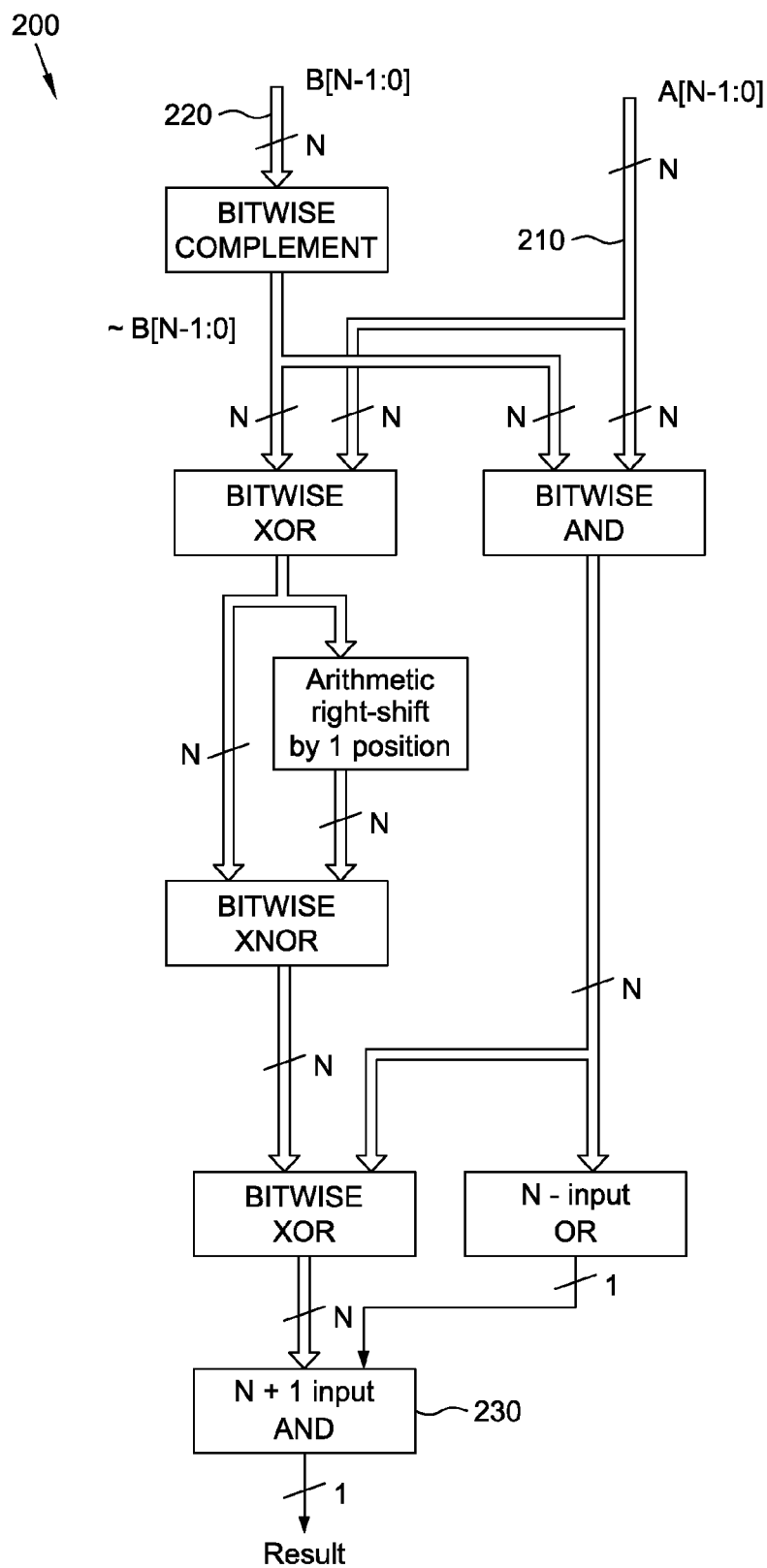
FIG. 2 illustrates a block diagram of an apparatus for implementing a comparison operation, when the difference between the two multi-bit vectors is equal to +1, in a digital logic circuit according to an embodiment of the present subject matter.

The digital logic circuit diagram 200 shown in FIG. 2 illustrates an example implementation of the above comparison operation algorithm to determine whether the difference between two received first N-bit vector and the second N-bit vector, A[N−1:0] and B[N−1:0], respectively, is equal to +1. As shown in FIG. 2, the digital logic circuit 200 includes a first processing path 210, a second processing path 220, and a final output module 230.

In operation, the first processing path 210 receives a first N-bit vector A[N−1:0]. The second processing path 220 that is in parallel with the first processing path 210 receives a second N-bit vector B[N−1:0]. The second processing path 220 performs a bit-wise inversion of the second N-bit vector B[N−1:0] and obtains a ~B[N−1:0]. The first processing path 210 then performs a bit-wise AND (A[N−1:0] & ~B[N−1:0]) operation using the A[N−1:0] and the ~B[N−1:0] and obtains a third N-bit vector. The second processing path 220 then performs a bit-wise XOR (A[N−1:0]^~B[N−1:0]) operation using the A[N−1:0] and the ~B[N−1:0] and obtains a fourth N-bit vector.

In some embodiments, the second processing path 220 obtains a fifth N-bit vector by performing a bit-wise ANOR operation between the fourth N-bit vector and another N-bit vector obtained by performing an arithmetic right-shift operation on the fourth N-bit vector. The second processing path then performs a bit-wise XOR operation on the fifth N-bit and the third N-bit vectors and obtains the sixth N-bit vector. The final output module 230, i.e., a final N+1-input AND gate, then declares a difference between the A[N−1:0] and B[N−1:0] is equal to +1.

In some embodiments, the second processing path 220 determines whether there is only one 0 to 1 bit transition present in the fourth N-bit vector when scanning the fourth N-bit vector from a least significant bit (LSB) to a most significant bit (MSB). The second processing path 220 then determines whether a bit in the corresponding position, where the 0 to 1 bit transition occurs in the fourth N-bit vector, is equal to 1 in the third N-bit vector and remaining bits are equal to 0 if there is only one 0 to 1 bit transition present in the fourth N-bit vector. The final output module 230 then declares the difference between the first N-bit vector A[N−1:0] and the second N-bit vector B[N−1:0] as equal to +1 if the bit in the corresponding position, where the 0 to 1 bit transition occurs in the fourth N-bit vector, is equal to 1 in the third N-bit vector and the remaining bits are equal to 0.

The operation of the digital logic circuit 200 shown in FIG. 2 is explained in more detail with reference to FIG. 1. It can be seen in FIG. 2, the above described comparison operation does not require a full fledged addition and/or subtraction and therefore the above technique is significantly smaller in area as it requires less number of logic gates. This operation is faster as well, as it involves significantly lower logic depth.

Figure 3:
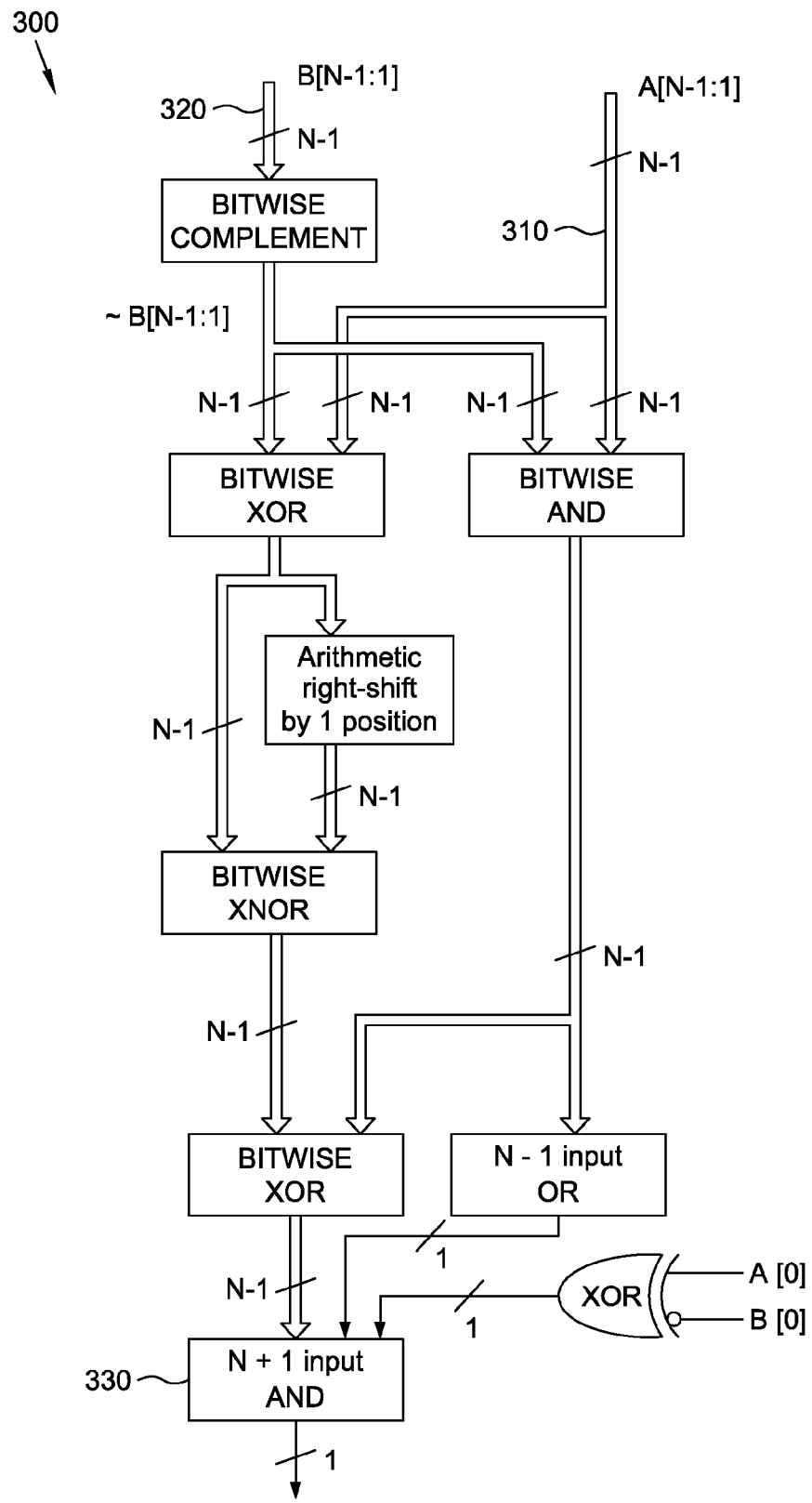
FIG. 3 illustrates a block diagram of an apparatus for implementing a comparison operation, when the difference between the two multi-bit vectors is equal to +2, in a digital logic circuit according to an embodiment of the present subject matter.

The digital logic circuit diagram 300 shown in FIG. 3 illustrates an example implementation of the above comparison operation algorithm for received N-bit vectors A[N−1:0] and B[N−1:0] determine whether the difference is equal to +2. As shown in FIG. 3, the digital logic circuit 300 includes a first processing path 310, a second processing path 320, and a final output module 330. The operation of the digital logic circuit 300 to use for comparison operation for received N-bit vectors A[N−1:0] and B[N−1:0] to determine whether the difference is equal to +2 is explained in more detail with reference to FIG. 1.

Figure 4:
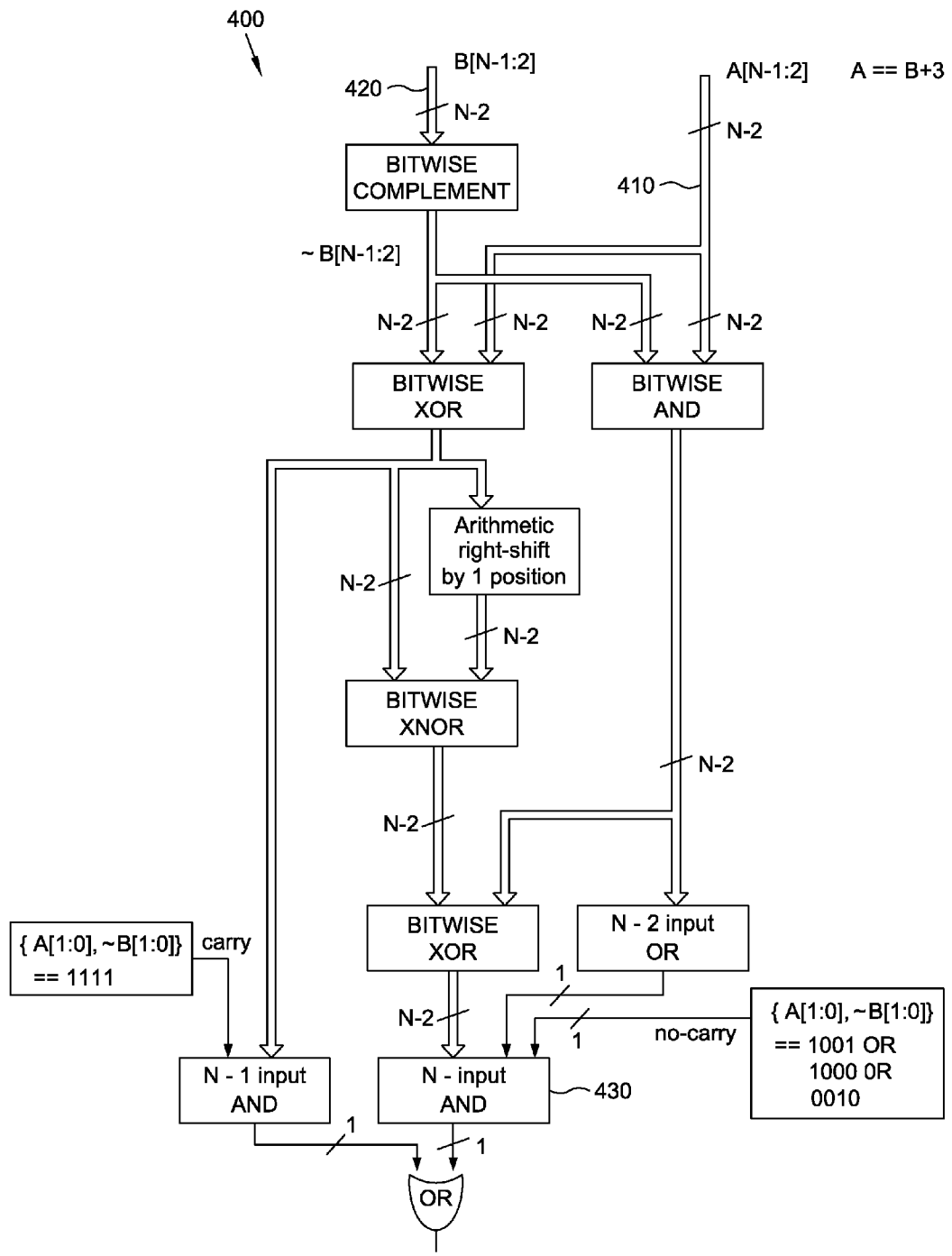
FIG. 4 illustrates a block diagram of an apparatus for implementing a comparison operation, when the difference between the two multi-bit vectors is equal to +3, in a digital logic circuit according to an embodiment of the present subject matter.

The digital logic circuit diagram 400 shown in FIG. 4 illustrates an example implementation of the above comparison operation algorithm for received N-bit vectors A[N−1:0] and B[N−1:0] to determine whether the difference is equal to +3. As shown in FIG. 4, the digital logic circuit 400 includes a first processing path 410, a second processing path 420, and a final output module 430. The operation of the digital logic circuit 400 to use for comparison operation for received N-bit vectors A[N−1:0] and B[N−1:0] to determine whether the difference is equal to +3 is explained in more detail with reference to FIG. 1.

Figure 5:
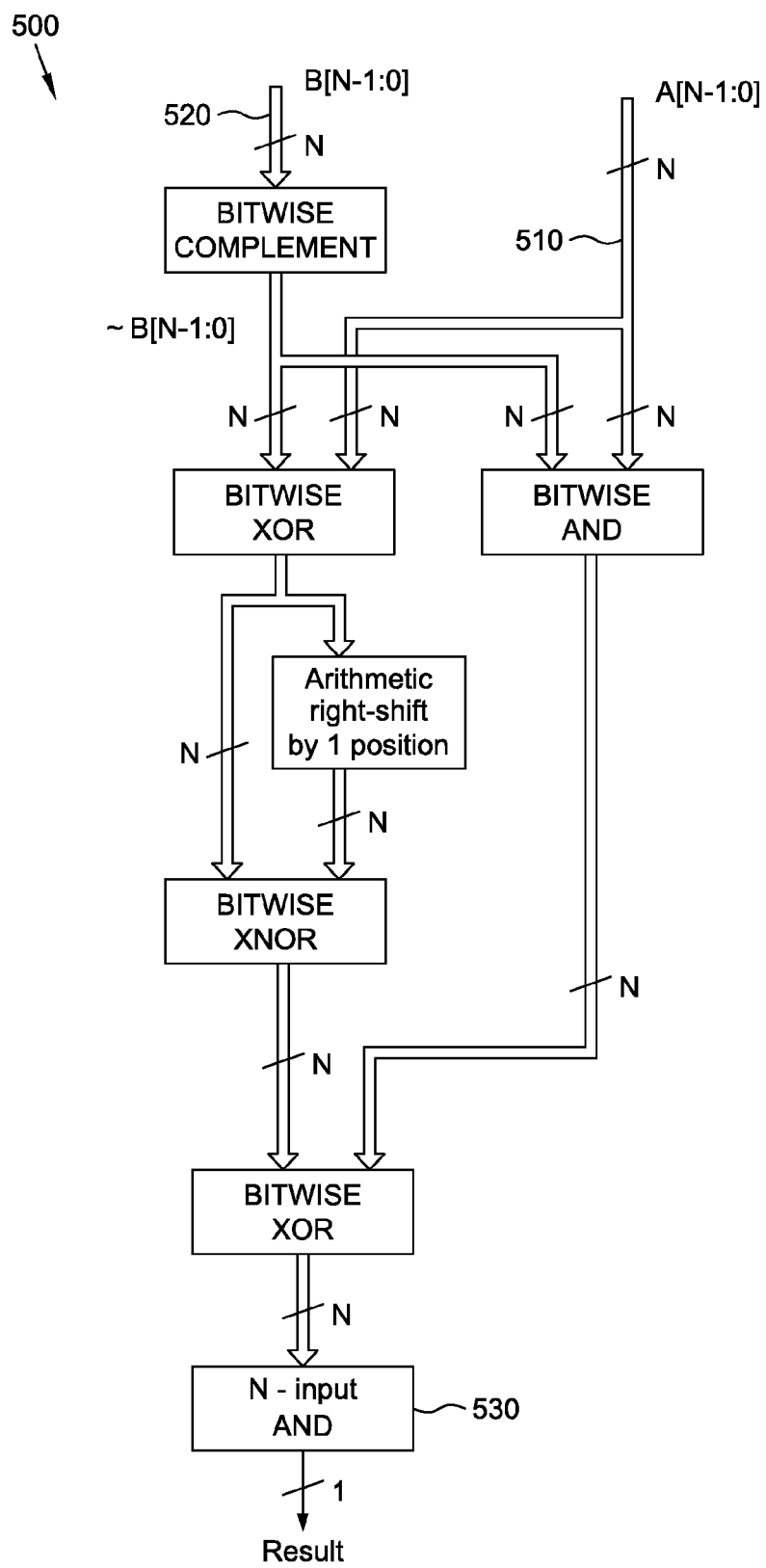
FIG. 5 illustrates a block diagram of an apparatus for implementing a comparison operation, when the difference between the two multi-bit vectors is equal to 0 or equal to +1, in a digital logic circuit according to an embodiment of the present subject matter.

The digital logic circuit diagram 500 shown in FIG. 5 illustrates an example implementation of the above comparison operation algorithm for received N-bit vectors A[N−1:0] and B[N−1:0] to determine whether the difference that equal to 0 or equal to +1. As shown in FIG. 5, the digital logic circuit 500 includes a first processing path 510, a second processing path 520, and a final output module 530. The operation of the digital logic circuit 500 to use for comparison operation for received N-bit vectors A[N−1:0] and B[N−1:0] to determine whether the difference is equal to 0 or equal to +1 is explained in more detail with reference to FIG. 1.

The above-described technique virtually eliminates the need for addition/subtraction operation while doing a comparison operation on the two operands to determine if the difference between the two operands is one of 0, +1, +2, . . . +n or is within a range of +m to +n. Further, since the above-described technique does not require a full fledged addition or subtraction and therefore requires significantly less number of logic gates and is significantly faster. Furthermore, in an implementation comprising a typical set of library cells, the above technique requires only about ⅓$^{rd}$ the silicon area and about half the logic delay required for a conventional technique that employs addition or subtraction operation. The above technique is scalable to any difference value of n.

Although, the above example embodiments shown in FIGS. 1-5 are explained with reference to performing comparison operation on two multi-bit vectors to see if the differences are +1, +2, and/or +3, the above-described technique is not limited to check whether the difference of two multi-bit vectors are +1, +2, and/or +3, but it can be used to compare two multi-bits to see the differences are +1, +2, . . . and/or +n, wherein n is known. Although the implementations of the above techniques are shown by using logic gates in FIGS. 2-5, they are only shown to illustrate actual depth of the logic, and one can envision alternate implementations which can use different gates.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-5 are merely representational and are not drawn to scale. Certain proportions thereof may be exaggerated, while others may be minimized. FIGS. 1-5 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method for performing a comparison operation on a first N-bit vector A[N−1:0] and a second N-bit vector B[N−1:0] in a digital logic circuit, wherein N is a nonzero positive number, comprising: performing, with a bit-wise complement circuit, a bit-wise inversion of B[N−1:0] to obtain ~B[N−1:0]; obtaining a third N-bit vector by performing, with a bitwise AND circuit, a bit-wise AND operation using the A[N−1:0] and the ~B[N−1:0] N-bit vectors; obtaining a fourth N-bit vector by performing, with a first bit-wise XOR circuit, a bitwise XOR operation using the A[N−1:0] and the ~B[N−1:0] N-bit vectors; obtaining a fifth N-bit vector by performing, with a bit-wise XNOR circuit, a bit-wise XNOR operating using the fourth N-bit vector and a one-bit-right-shifted version of the fourth N-bit vector; obtaining a sixth N-bit vector by performing, with a second bit-wise XOR circuit, a bitwise XOR operation using the third N-bit vector and the fifth N-bit vector; and obtaining a 1-bit result by performing, with an N+1 input AND circuit, an AND operation using the sixth N-bit vector and the result of ORing the third N-bit vector, wherein the result is a first value if a difference between the A[N−1:0] and B[N−1:0] vectors is equal to +1 and a second value for other differences therebetween.

2. The method of claim 1, further comprising: receiving the first N-bit vector A[N−1:0] and the second N-bit vector B[N−1:0].

3. The method of claim 2, in receiving, the first N-bit vector A[N−1:0] and the second N-bit vector B[N−1:0], the N-bit vector is an 8-bit vector, a 16-bit vector, a 24-bit vector, a 32-bit vector or a 64-bit vector.

4. A method for performing a comparison operation on a first N-bit vector A[N−1:0] and a second N-bit vector B[N−1:0] in a digital logic circuit, wherein N is a nonzero positive number, comprising: performing, with a bit-wise complement circuit, a bit-wise inversion of B[N−1:1] to obtain ~B[N−1:1]; obtaining a third (N−1)-bit vector by performing, with a bitwise AND circuit, a bit-wise AND operation using A[N−1:1] and the ~B[N−1:1] (N−1)-bit vectors; obtaining a fourth (N−1)-bit vector by performing, with a first bit-wise XOR circuit, a bitwise XOR operation using A[N−1:1] and the ~B[N−1:1] (N−1)-bit vectors; obtaining a fifth (N−1)-bit vector by performing, with a bit-wise XNOR circuit, a bit-wise XNOR operating using the fourth (N−1)-bit vector and a one-bit-right-shifted version of the fourth (N=1)-bit vector; obtaining a sixth (N−1)-bit vector by performing, with a second bit-wise XOR circuit, a bit-wise XOR operation using the third (N−1)-bit vector and the fifth (N−1)-bit vector; and obtaining a 1-bit result by performing, with an N+1 input AND circuit, an AND operation using the sixth (N−1)-bit vector, the result of ORing the third (N−1)-bit vector, and the result of XORing A[0] and ~B[0], wherein the result is a first value if a difference between the A[N−1:0] and B[N−1:0] vectors is equal to +2 and a second value for other differences therebetween.

5. A method for performing a comparison operation on a first N-bit vector A[N−1:0] and a second N-bit vector B[N−1:0] in a digital logic circuit, wherein N is a nonzero positive number, comprising: performing, with a bit-wise complement circuit, a bit-wise inversion of B[N−1:2] to obtain ~B[N−1:2]; obtaining a third (N−2)-bit vector by performing, with a bitwise AND circuit, a bit-wise AND operation using A[N−1:2] and the ~B[N−1:2] (N−2)-bit vectors; obtaining a fourth (N−2)-bit vector by performing, with a first bit-wise XOR circuit, a bitwise XOR operation using A[N−1:2] and the ~B[N−1:2] (N−2)-bit vectors; obtaining a fifth (N−2)-bit vector by performing, with a bit-wise XNOR circuit, a bit-wise XNOR operating using the fourth (N−2)-bit vector and a one-bit-right-shifted version of the fourth (N−2)-bit vector; obtaining a sixth (N−2)-bit vector by performing, with a second bit-wise XOR circuit, a bit-wise XOR operation using the third (N−2)-bit vector and the fifth (N−2)-bit vector; and obtaining a 1-bit result by ORing (i) the result of a N−1 input AND circuit using the sixth (N−2) vector and a carry-out of A[1:0] and ~B[1:0] and (ii) the result of an N-input AND circuit using the sixth (N−2)-bit vector, the result of ORing the third (N−2)-bit vector, and a no-carry condition of A[1:0] and ~B[1:0], wherein the result is a first value if a difference between the A[N−1:0] and B[N−1:0] vectors is equal to +3 and a second value for other differences therebetween.

6. The method of claim 5, further comprising: determining whether two LSBs of the A[N−1:0] and corresponding bits in two LSBs of the ~B[N−1:0] are both equal to 11; if so, determining whether remaining bits in the fourth N-bit vector is equal to 1; and if so, declaring the difference between the A[N−1:0] and the B[N−1:0] as equal to +3.

7. A digital logic circuit for performing a comparison operation on a first N-bit vector A[N−1:0] and a second N-bit vector B[N−1:0], comprising: a first processing path for receiving a first N-bit vector A[N−1:0] and a second N-bit vector B[N−1:0]; a second processing path in parallel with the first processing path to receive the first N-bit vector A[N−1:0] and a second N-bit vector B[N−1:0], wherein the second processing path comprises: (i) a bit-wise complement circuit to perform a bit-wise inversion of the second N-bit vector B[N−1:0] to obtain ~B[N−1:0], (ii) a bit-wise AND circuit to perform a bit-wise AND operation using the A[N−1:0] and the ~B[N−1:0] N-bit vectors to obtain a third N-bit vector, (iii) a first bit-wise XOR circuit to perform a bit-wise XOR operation using the A[N−1:0] and the ~B[N−1:0] N-bit vectors to obtain a fourth N-bit vector, (iv) a bit-wise XNOR circuit to perform a bit-wise XNOR operating using the fourth N-bit vector and a one-bit-right-shifted version of the fourth N-bit vector to obtain a fifth N-bit vector, and (v) a second bit-wise XOR circuit to perform a bit-wise XOR operation using the third N-bit vector and the fifth N-bit vector to obtain a sixth N-bit vector; and a final output module comprising an AND gate for declaring a difference between the A[N−1:0] and B[N−1:0] N-bit vectors as equal to a given number, based at least in part on detecting, with the AND gate, the presence of any binary 1 bits in the sixth N-bit vector.

8. The digital logic circuit of claim 7, wherein the N-bit vector is an 8-bit vector, a 16-bit vector, a 24-bit vector, a 32-bit vector or a 64-bit vector.

9. The digital logic circuit of claim 7, wherein the second processing path determines whether there is only one 0 to 1 bit transition present in the fourth N-bit vector when the bits in the fourth N-bit vector from least significant bit (LSB) to most significant bit (MSB), wherein the second processing path determines whether a bit in the corresponding position, where the 0 to 1 bit transition occurs in the fourth N-bit vector, is equal to 1 in the third N-bit vector and remaining bits are equal to 0, and wherein the final output module declares the difference between the first N-bit vector A[N−1:0] and the second N-bit vector B[N−1:0] as equal to +1 if the bit in the corresponding position, where the 0 to 1 bit transition occurs in the fourth N-bit vector, is equal to 1 in the third N-bit vector and the remaining bits are equal to 0.

* * * * *